Patented July 3, 1951

2,559,370

UNITED STATES PATENT OFFICE 2,559,370

PROCESS FOR THE MANUFACTURE OF OXIDE OF COPPER RECTIFIERS

Moises Reidel, Buenos Aires, Argentina

No Drawing. Application March 5, 1948, Serial No. 13,349. In Argentina December 16, 1947

3 Claims. (Cl. 175—366)

This invention relates to a novel process for the manufacture of oxide of copper rectifiers.

For the industrial use of electric energy, in numerous cases direct current has to be relied upon, notwithstanding the advantages offered by the transformation of tensions into alternate current.

This problem has technically been solved by means of the use of current rectifiers.

One of such rectifiers, of particular interest in the present case, is the dry rectifier or oxide of copper rectifier. The function of such elements consists, as indicated by their name, in rectifying, i. e., in either destroying one half of a wave, or in inverting said half of a wave so as to obtain a direct current.

This process is performed by making use of the particular electric characteristics inherent to this element. In order to facilitate the understanding, I shall refer to the phenomenon of electric conduction. As is well known, an element called conductive is that which on tension being applied intermediate its ends, will allow of the passage of a current which solely depends of what is called its ohmic resistance. Whichever be the direction or polarity of the tension applied to the value of the circulating current, it will always be only one; and this relation between tension and resistance is known as the ohmic law.

Rectifiers are elements of asymmetric conductivity; in consequence, they are not ruled by Ohm's law. This means that when tension is applied in the direction of copper oxide-copper, the current conducted will be of a determined value, and when the polarity of the tension is reversed, the current will be of a different value; the relation between both current values measured for the same value of tension, is what is known as asymmetric relation. For a good rectifier, the asymmetric relation should be of a value not less than 1,000, and for rectifiers of exceptional conditions, said value may even amount to 10,000.

The original discovery of copper oxide rectifiers was made by Grondahl, in 1927. The process used by him for obtaining a rectifier, then consisted in heating a copper plate to a certain temperature, in order to form on the copper a layer of red oxide, which is found to be firmly bound thereto owing to its melting point being approximately that of copper. Thereupon, graphite was placed on the layer of red oxide of copper, and onto this layer of graphite, a film of lead was applied, which acted as a counter-electrode, the whole being submitted to a heavy uniform pressure. According to this process, the rectifier thus obtained consisted of a layer of copper, with a layer of red cuprous oxide and on this latter, a film of lead and following these, the element on which the electrical contact was to be established, viz., another sheet of copper, or of bronze or similar materials.

Into this original process, numerous modifications were introduced by Grondahl himself and other investigators. Schottky demonstrated that the most characteristic feature of the phenomenon takes place within the barrier or gap existing between the layer of cuprous oxide and the copper, i. e., that the phenomenon of rectification is characterized by the existence of said gap or barrier which operates as an obstructing layer to prevent the passage of the electrical current in the direction copper oxide-copper, and in this direction only.

In fact, this may actually be shown in very simple manners; for instance, when reducing, by means of chemical processes, the copper oxide on the copper, theoretically the same characteristics as those of the rectifier obtained by a thermic process will be observed.

But this element is devoid of rectifying properties, its conductivity is symmetric and the current is exclusively limited to the resistance offered by the layer of cuprous oxide. In consequence, the difficulty encountered is the lack of an element to be interposed between the cuprous oxide and the copper, which would determine whether the union copper-copper oxide would prove rectifying or not.

Even up to this date, it has not been shown which are the components of the said layer; the only fact clearly demonstrated is that electrical conductivity is an exclusively electronic phenomenon, and no modification whatsoever is caused in the cuprous oxide during the passage of the current.

Heretofore, the endeavors of all the investigators had for purpose to improve the gap or barrier, and owing to this latter being formed during the thermic process, the researches tended to improve this latter, as well as the contact which was established by the lead submitted to pressure. Besides, the electrolytic reduction of the copper oxide to copper and its ultimate nickel-plating or similar means were also considered.

Further improvements introduced consisted in eliminating the film or coating of cupric oxide or black oxide, forcibly formed during the cooling of the rectifier and which only acts to interfere with the rectifying function.

The applicant, to the contrary, basing himself on the fact or on the thesis that the obstructing layer as well as the cuprous oxide perform a simultaneous roll in the rectifying function, investigated the cuprous oxide and its successive allotropic modifications and found that nitriding the said layer, causes effects independent of the obstructing layer and thus modifies the characteristics which apparently might not be altered, in view of the said obstructing layer having been formed by a thermic process.

Briefly stated, this invention is limited to the modification of the cuprous oxide by nitriding the same, thereby obtaining cupric cuprous nitrates in solution with cuprous oxide.

For practically performing this invention, the rectifier obtained by thermic means, is immersed in concentrated nitric acid or in a strong solution of the same, in order to obtain the nitriding of the cuprous oxide. The results obtained by the modification of the cuprous oxide in the manner stated, allow of attaining the following advantages:

By the known means, a rectifier only admits of a maximum of 4 volts of direct current for elements and normal rates of 0.5 amp. per $cm^2$. After nitriding, the same element admits up to 10 volts of direct current and yields densities of up to 1 amp. per $cm^2$. The rectifying relations increase from values of 500–600, to values of up to 3–8.000, thus obtaining loss currents at working temperatures lower than those used in connection with the known rectifiers. Normally, the cost of production is influenced thereby to the degree of reducing the same to about two thirds of the nominal cost according to the prior methods.

When viewed through a magnifier, the rectifier in accordance with this invention, in its layer of cuprous oxide, resembles a net of red crystals, intermeshed with white crystals formed by nitriding, which may be cupric and cuprous nitrates. On the other hand, the nitriding action reduces to a marked degree the resistance in the direction of direct conduction, while the resistance in the opposite direction is considerably increased.

Having now particularly described and ascertained the nature of my said invention and in what manner the same is to be performed, I declare that what I claim and desire to secure by Letters Patent, is:

1. A process for the manufacture of copper rectifiers comprising the steps of forming a layer of cuprous oxide by a thermic process; and subsequently nitriding said layer of cuprous oxide by immersing the rectifier in nitric acid, whereby cupric cuprous nitrates in solution with cuprous oxide are obtained.

2. A process for the manufacture of copper rectifiers comprising the steps of forming a layer of cuprous oxide by a thermic process; and subsequently nitriding said layer of cuprous oxide by immersing the rectifier in a concentrated solution of nitric acid, whereby cupric cuprous nitrates in solution with cuprous oxide are obtained.

3. A process for the manufacture of copper rectifiers comprising the steps of forming a layer of cuprous oxide by a thermic process, and nitriding said layer of cuprous oxide while still at elevated temperature by immersing the rectifier in nitric acid, whereby cupric cuprous nitrates in solution with cuprous oxide are obtained.

MOISES REIDEL.

REFERENCES CITED

The following references are of record in the file of this patent:

UNITED STATES PATENTS

| Number | Name | Date |
|---|---|---|
| 2,320,962 | Wilson | June 1, 1943 |
| 2,367,943 | Hein | Jan. 23, 1945 |
| 2,399,773 | Waintrob | May 7, 1946 |
| 2,441,119 | Casellini | May 5, 1948 |